United States Patent
Akuzawa et al.

(10) Patent No.: US 10,794,708 B2
(45) Date of Patent: Oct. 6, 2020

(54) SERVER SYSTEM AND METHOD FOR WATERCRAFT CRUISE TRAJECTORY BASED ON PROPULSION TYPE

(71) Applicant: YAMAHA HATSUDOKI KABUSHIKI KAISHA, Iwata-shi, Shizuoka (JP)

(72) Inventors: Shu Akuzawa, Shizuoka (JP); Yoshimasa Kinoshita, Shizuoka (JP); Masaru Tamaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 301 days.

(21) Appl. No.: 15/939,340

(22) Filed: Mar. 29, 2018

(65) Prior Publication Data

US 2018/0292215 A1    Oct. 11, 2018

(30) Foreign Application Priority Data

Apr. 6, 2017  (JP) .................................. 2017-075963

(51) Int. Cl.
*G01C 21/20* (2006.01)
*G05D 1/02* (2020.01)
(Continued)

(52) U.S. Cl.
CPC ............ *G01C 21/203* (2013.01); *B63B 49/00* (2013.01); *B63B 79/40* (2020.01); *G05D 1/0011* (2013.01);
(Continued)

(58) Field of Classification Search
CPC .. G01C 21/203; G01C 21/3484; B63B 79/40; B63B 49/00; H04W 4/027; H04W 4/026; H04W 12/06; H04W 4/029; H04W 12/02; H04W 4/40; G05D 1/0011; G05D 1/0206
See application file for complete search history.

(56) References Cited

U.S. PATENT DOCUMENTS

| | | | |
|---|---|---|---|
| 8,155,811 B2 * | 4/2012 | Noffsinger et al. | ......................... G05D 1/0206 701/21 |
| 8,626,366 B2 * | 1/2014 | Noffsinger et al. | ......................... G05D 1/0206 701/21 |

(Continued)

FOREIGN PATENT DOCUMENTS

| JP | 11-345397 A | 12/1999 |
|---|---|---|
| JP | 2000-182199 A | 6/2000 |

(Continued)

*Primary Examiner* — Dale W Hilgendorf
(74) *Attorney, Agent, or Firm* — Keating and Bennett, LLP

(57) ABSTRACT

A server system includes a communicator, a storage, and a controller. The controller is configured or programmed to receive positional information of a watercraft that a user of a wireless communication terminal is aboard and propulsion device information from the wireless communication terminal through the communicator. The propulsion device information indicates a type of a propulsion device on the watercraft. The controller creates cruise trajectory information and stores the created cruise trajectory information in the storage based on the positional information of the watercraft in association with the type of the propulsion device on the watercraft. The controller determines a frequency at which cruise trajectories of the watercraft match the cruise trajectories based on the cruise trajectory information in the storage. The controller creates cruise route information in association with the type of the propulsion device on the watercraft.

14 Claims, 15 Drawing Sheets

(51) Int. Cl.
    *B63B 49/00*         (2006.01)
    *G05D 1/00*         (2006.01)
    *H04W 4/02*         (2018.01)
    *B63B 79/40*        (2020.01)
    *H04W 4/40*         (2018.01)
    *H04W 12/02*       (2009.01)
    *H04W 4/029*       (2018.01)
    *G01C 21/34*       (2006.01)
    *H04W 12/06*       (2009.01)

(52) U.S. Cl.
    CPC .......... *G05D 1/0206* (2013.01); *H04W 4/026* (2013.01); *H04W 4/027* (2013.01); *G01C 21/3484* (2013.01); *H04W 4/029* (2018.02); *H04W 4/40* (2018.02); *H04W 12/02* (2013.01); *H04W 12/06* (2013.01)

(56) References Cited

U.S. PATENT DOCUMENTS

| | | | |
|---|---|---|---|
| 2010/0185471 A1* | 7/2010 | Chen et al. .......... | G01C 21/203 705/7.38 |
| 2017/0052029 A1 | 2/2017 | Ninomiya et al. | |
| 2018/0043976 A1* | 2/2018 | Nakamoto et al. .. | G01C 21/203 |

FOREIGN PATENT DOCUMENTS

| | | |
|---|---|---|
| JP | 2001-043500 A | 2/2001 |
| JP | 2002-324228 A | 11/2002 |
| JP | 2005-101992 A | 4/2005 |
| JP | 2016-177382 A | 10/2016 |
| JP | 2017-041071 A | 2/2017 |

\* cited by examiner

FIG. 13

| YEAR/MONTH /DAY (DOW) | | HIGH TIDE | | | | | | | | LOW TIDE | | | | | | | |
|---|---|---|---|---|---|---|---|---|---|---|---|---|---|---|---|---|---|
| | | TIME | TIDE LEVEL | TIME | TIDE LEVEL | TIME | TIDE LEVEL | TIME | TIDE LEVEL | TIME | TIDE LEVEL | TIME | TIDE LEVEL | TIME | TIDE LEVEL | TIME | TIDE LEVEL |
| 2017/02/09 (THU) | | 5:31 | 102 | 16:25 | 105 | * | * | * | * | 11:10 | 50 | 23:30 | −13 | * | * | * | * |
| 2017/02/10 (FRI) | | 6:07 | 107 | 17:12 | 109 | * | * | * | * | 11:51 | 44 | * | * | * | * | * | * |
| 2017/02/11 (SAT) | ○ | 6:39 | 110 | 17:55 | 112 | * | * | * | * | 0:11 | −14 | 12:28 | 39 | * | * | * | * |

45

SERVER SYSTEM AND METHOD FOR WATERCRAFT CRUISE TRAJECTORY BASED ON PROPULSION TYPE

CROSS REFERENCE TO RELATED APPLICATIONS

This application claims the benefit of priority to Japanese Patent Application No. 2017-075963 filed on Apr. 6, 2017. The entire contents of this application are hereby incorporated herein by reference.

BACKGROUND OF THE INVENTION

1. Field of the Invention

The present invention relates to a server system for and a method of supporting cruising of a watercraft.

2. Description of the Related Art

In recent years, a type of server system has been proposed that accumulates positional information of a small watercraft transmitted thereto from a portable terminal mounted to the small watercraft, and provides a user with a cruise route available for cruising of the small watercraft. For example, Japan Laid-open Patent Application Publication No. 2016-177382 describes a server system configured as follows. The server system receives size (displacement) information of a watercraft together with positional information of the watercraft. Then, the server system creates and updates information of a cruise route available for cruising of the watercraft in accordance with the size of the watercraft. Accordingly, the server system can provide information of a cruise route (a sea route map) actually used in the past.

However, whether or not a watercraft is capable of cruising is affected not only by the size of the watercraft but also by other factors. Even when watercrafts have the same size, whether or not the watercrafts are capable of cruising depends on the types of marine propulsion devices on the watercrafts. For example, a portion of a watercraft, protruding downward from the bottom of the watercraft, has a smaller size in a type of watercraft provided with a jet propulsion device than in a type of watercraft provided with an outboard motor. Therefore, the type of watercraft provided with the jet propulsion device is capable of cruising on a shallower cruise route than the type of watercraft provided with the outboard motor, even though these types of watercrafts have the same size. In another example, a keel, protruding downward from the bottom of a watercraft, is larger in a yacht than in the type of watercraft provided with the outboard motor. Therefore, the yacht is not capable of cruising on a shallow cruise route unlike the type of watercraft provided with the outboard motor, even though these types of watercrafts have the same size.

Therefore, when such a server system as described in Japan Laid-open Patent Application Publication No. 2016-177382 creates information of a cruise route available for cruising of a watercraft in accordance with the size of the watercraft, it is difficult to create the information of the cruise route with high precision.

SUMMARY OF THE INVENTION

Preferred embodiments of the present invention provide server systems that communicate with wireless communication terminals, and include a communicator, a storage, and a controller. The controller is configured or programmed to receive positional information of a watercraft that a user of the wireless communication terminal is aboard and propulsion device information from the wireless communication terminal through the communicator. The propulsion device information indicates a type of a propulsion device on the watercraft. The controller is configured or programmed to create cruise trajectory information and store the created cruise trajectory information in the storage based on the positional information of the watercraft in accordance with the type of the propulsion device on the watercraft. The cruise trajectory information indicates an actual cruise trajectory of the watercraft. The controller is configured or programmed to determine a matching frequency at which cruise trajectories of the watercraft match the cruise trajectories of the cruise trajectory information stored in the storage. The controller creates cruise route information in association with the type of the propulsion device on the watercraft. The cruise route information displays matching positions at which the cruise trajectories of the watercraft match cruise trajectories of the cruise trajectory information in a visually distinguishable manner in accordance with the matching frequency.

Methods according to other preferred embodiments of the present invention are executed by a controller in a server system communicating with a wireless communication terminal and a storage, and include performing a first process to receive positional information of a watercraft that a user of the wireless communication terminal is aboard and propulsion device information from the wireless communication terminal. The propulsion device information indicates a type of a propulsion device on the watercraft. A second process creates cruise trajectory information and stores the created cruise trajectory information in the storage based on the positional information of the watercraft in association with the type of the propulsion device on the watercraft. The cruise trajectory information indicates an actual cruise trajectory of the watercraft. A third process determines a matching frequency at which cruise trajectories of the watercraft match the cruise trajectories of the cruise trajectory information stored in the storage. A fourth process creates cruise route information in association with the type of the propulsion device on the watercraft. The cruise route information displays matching position at which the cruise trajectories of the watercraft match cruise trajectories of the cruise trajectories of the cruise trajectory information in a visually distinguishable manner in accordance with the matching frequency.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13 is a diagram showing an example of tide level information.

DETAILED DESCRIPTION OF THE PREFERRED EMBODIMENTS

Figure 1:
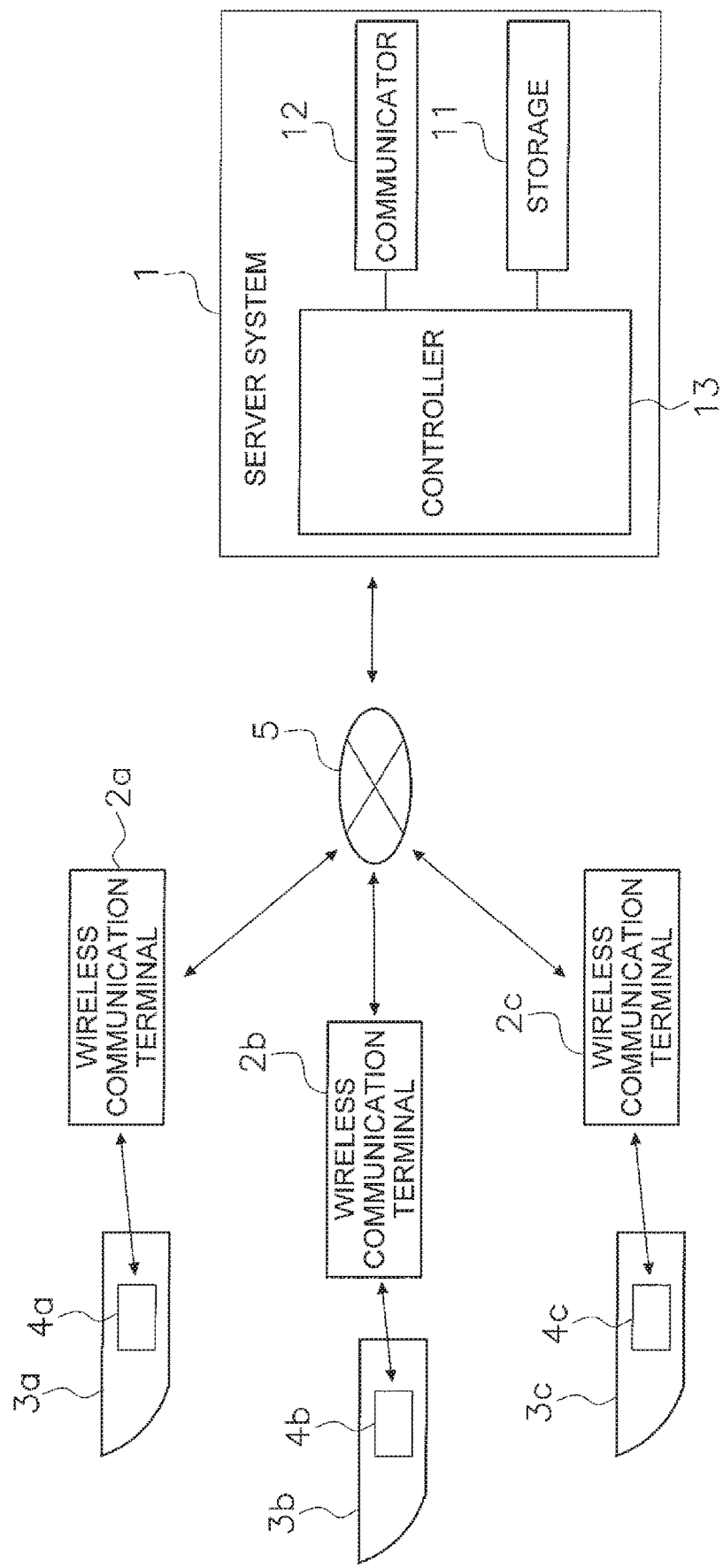
FIG. 1 is a diagram schematically showing a configuration of a cruising support system according to a preferred embodiment of the present invention.

Server systems according to preferred embodiments will be hereinafter explained with reference to drawings. FIG. 1 is a diagram schematically showing a configuration of a cruising support system according to a preferred embodiment of the present invention. As shown in FIG. 1, the cruising support system includes a server system 1 and a plurality of wireless communication terminals 2a, 2b and 2c. It should be noted that three wireless communication terminals 2a, 2b and 2c are shown in FIG. 1 merely as an example, and these terminals are only a portion of the wireless communication terminals among a large number of users enrolled in a service of the cruising support system.

Users aboard watercrafts 3a, 3b and 3c bring the wireless communication terminals 2a, 2b and 2c with them, respectively. Each wireless communication terminal 2a, 2b, 2c is a mobile communication device such as a smart phone, a tablet, a PDA (Personal Digital Assistant), a laptop computer, a feature phone or so forth. Application software is able to be installed into each wireless communication terminal 2a, 2b, 2c.

The wireless communication terminals 2a, 2b and 2c communicate with devices 4a, 4b and 4c mounted on the watercrafts 3a, 3b and 3c, respectively, and obtain pieces of information regarding the watercrafts 3a, 3b and 3c from the devices 4a, 4b and 4c, respectively. Each device 4a, 4b, 4c includes, for instance, a water depth sensor and a vessel velocity sensor. Alternatively, when an engine is mounted to each watercraft 3a, 3b, 3c, each device 4a, 4b, 4c may include an ECU (Engine Control Unit) or an engine rotational speed sensor. Each wireless communication terminal 2a, 2b, 2c communicates with the server system 1 over a communication network 5. The communication network 5 may include, for instance, a mobile communication network such as a 3G network or an LTE (Long-Term Evolution) network and a public communication network such as the Internet.

Figure 2:
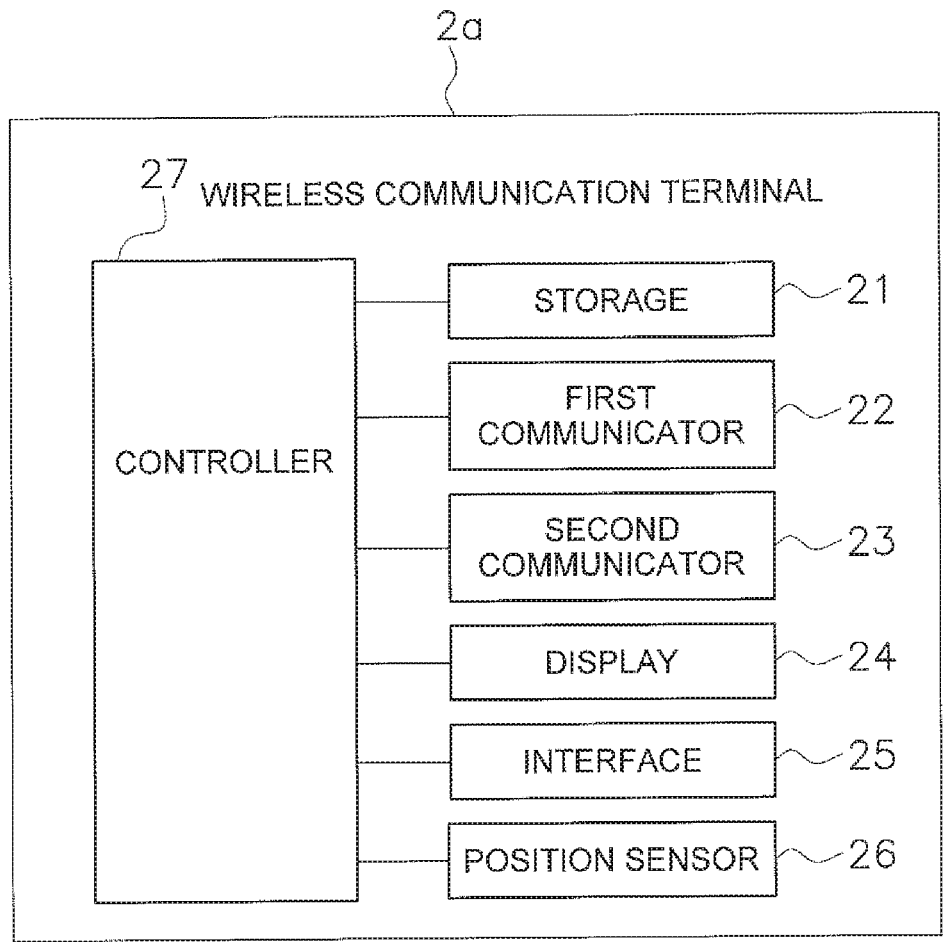
FIG. 2 is a diagram schematically showing a configuration of a wireless communication terminal.

FIG. 2 is a diagram schematically showing a configuration of the wireless communication terminal 2a. The other wireless communication terminals 2b and 2c have the same configuration as the wireless communication terminal 2a. Hence, in the following explanation, only the wireless communication terminal 2a will be described as an example.

As shown in FIG. 2, the wireless communication terminal 2a includes a storage 21, a first communicator 22, a second communicator 23, a display 24, an interface 25, a position sensor 26, and a controller 27. The storage 21 includes an electronic information medium such as a semiconductor memory, a magnetic recording medium or an optical recording medium. The storage 21 is an example of a non-transitory computer readable recording medium. The storage 21 stores a variety of programs and data.

The first communicator 22 is preferably a mobile communication module designed for wireless communication over the communication network 5, for example. The first communicator 22 wirelessly communicates with the server system 1 over the communication network 5. The second communicator 23 is preferably a communication module for short distance communication using Bluetooth (registered trademark) or Wi-Fi, for example. The second communicator 23 wirelessly communicates with the device 4a mounted on the watercraft 3a. Alternatively, the second communicator 23 may communicate with the device 4a by wired communication.

The display 24 is a display device, for instance, an LCD (Liquid Crystal Display), an organic EL (Electro-Luminescence) display or so forth. The display 24 displays an image in response to a signal transmitted thereto from the controller 27. The interface 25 preferably includes a touchscreen or hardware keys, for example. A signal, indicating an input performed by a user with respect to the interface 25, is inputted into the controller 27 from the interface 25. The position sensor 26 includes a GNSS (Global Navigation Satellite System) sensor such as a GPS (Global Positioning System) sensor and another type of sensor such as an IMU (Inertial Measurement Unit). For example, the position sensor 26 receives a GPS satellite signal from the GPS sensor, and detects positional information indicating the present position (a latitude and a longitude) of the wireless communication terminal 2a.

The controller 27 includes a processor such as a CPU and memories such as an RAM and an ROM. The controller 27 communicates with the storage 21, the first communicator 22, the second communicator 23, the display 24, the interface 25 and the position sensor 26 so as to control the wireless communication terminal 2a.

The server system 1 shown in FIG. 1 communicates with the plurality of wireless communication terminals 2a, 2b and 2c. In response to a request from each wireless communication terminal 2a, 2b, 2c, the server system 1 transmits data to each wireless communication terminal 2a, 2b, 2c. In response to the request from each wireless communication terminal 2a, 2b, 2c, the server system 1 receives data from each wireless communication terminal 2a, 2b, 2c. The server system 1 includes a storage 11, a communicator 12, and a controller 13.

The storage 11 includes an electronic information medium such as a semiconductor memory, a magnetic recording medium, or an optical recording medium. The storage 11 is an example of a non-transitory computer readable recording medium. The storage 11 stores a variety of programs and data. The communicator 12 communicates with the wireless communication terminals 2a, 2b and 2c over the communication network 5. The controller 13 includes a processor such as a CPU and memories such as an RAM and an ROM. The controller 13 communicates with the storage 11 and the communicator 12 so as to control the server system 1.

The storage 11 stores a program that provides each wireless communication terminal 2a, 2b, 2c with a function to navigate a cruise route (hereinafter referred to as "a marine navigation function"). The controller 13 executes the program to provide each wireless communication terminal 2a, 2b, 2c with the marine navigation function.

Application software to execute the marine navigation function is installed on or provided to each wireless communication terminal 2a, 2b, 2c. It should be noted that the application software to execute the marine navigation function may be preliminarily installed on each wireless communication terminal 2a, 2b, 2c. Alternatively, the application software may be downloaded into each wireless communication terminal 2a, 2b, 2c when communicating with the server system 1. For example, the application software may be a web application running on a browser.

Figure 3:
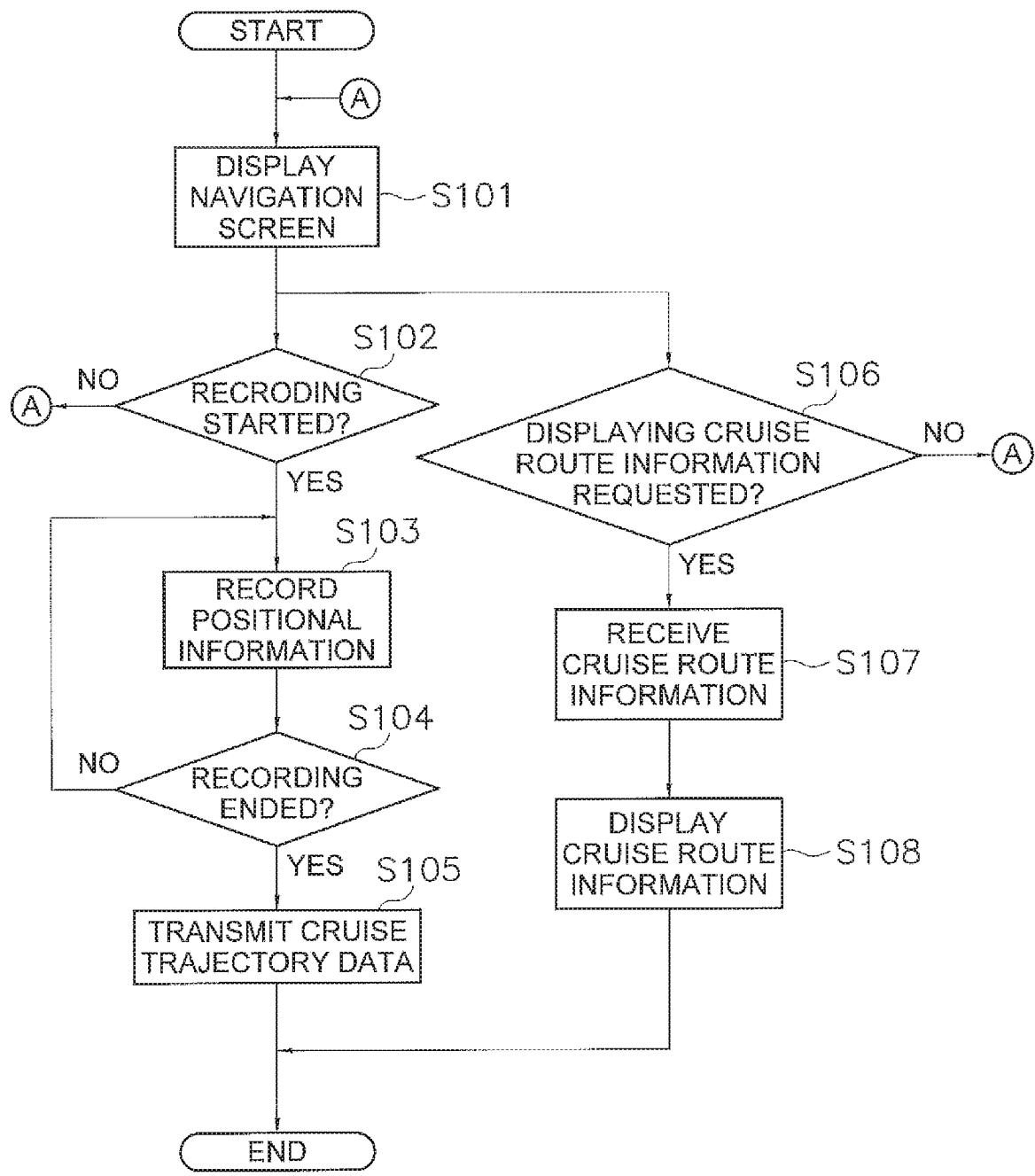
FIG. 3 is a flowchart showing processes to be executed by a controller of the wireless communication terminal.

The marine navigation function will be hereinafter explained in detail. FIG. 3 is a flowchart showing processes to be executed by the controller 27 of the wireless communication terminal 2a in the marine navigation function.

Figure 4:
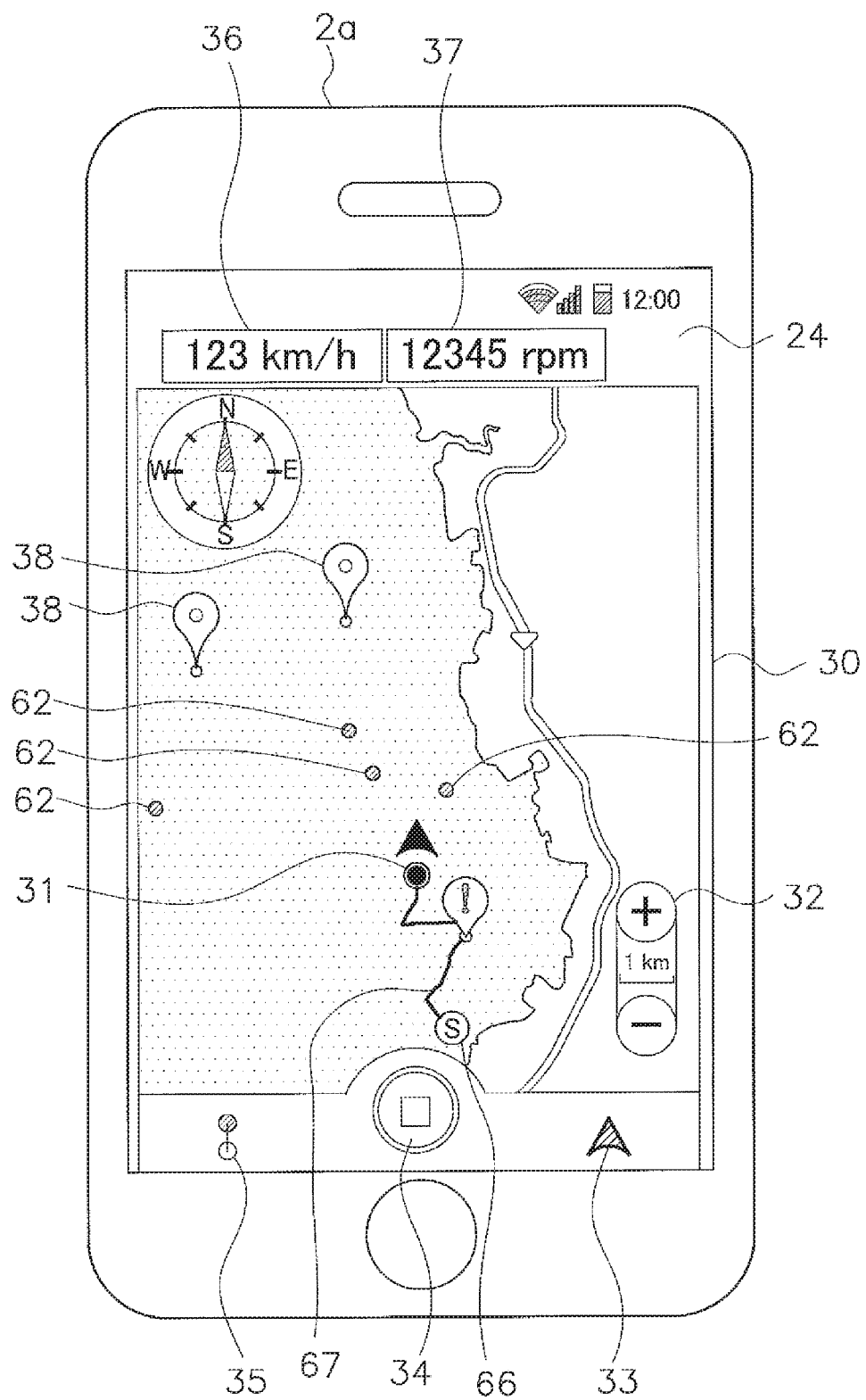
FIG. 4 is a diagram showing an example of a navigation screen.

When the application software is activated in the wireless communication terminal 2a, the controller 27 displays a navigation screen 30 on the display 24 in step S101. FIG. 4 is a diagram showing an example of the navigation screen 30.

As shown in FIG. 4, the navigation screen 30 includes a map of the surroundings of the watercraft 3a that a user is aboard and an icon 31 indicating the present position and direction of the watercraft 3a. The navigation screen 30 includes software keys 32 to 35 to operate the marine navigation function. It should be noted that the wireless communication terminal 2a may include hard keys instead of the software keys 32 to 35.

The navigation screen 30 may include information indicators 36 and 37 of the vessel velocity, the engine rotational speed and so forth. Data for the map may be preliminarily downloaded into the wireless communication terminal 2a from the server system 1, and may be stored in the storage 21. Alternatively, when the navigation screen 30 is displayed, the data for the map may be downloaded into the wireless communication terminal 2a from the server system 1 on an as-needed basis.

In step S102, the controller 27 determines whether or not recording of the positional information should be started. For example, when a user performs an operation to start recording the positional information with respect to the wireless communication terminal 2a, the controller 27 determines to start recording the positional information. Alternatively, the controller 27 may automatically determine to start recording the positional information in response to activation of the application software. When the controller 27 determines to start recording the positional information, the process proceeds to step S103.

In step S103, the controller 27 records the positional information of the watercraft 3a. The controller 27 records the positional information of the wireless communication terminal 2a into the storage 21 as the positional information of the watercraft 3a that the user is aboard. The positional information of the watercraft 3a includes, for example, the coordinates, direction and time in the present position of the watercraft 3a. The positional information of the watercraft 3a may include the water depth measured by the device 4a. The controller 27 records the positional information at intervals according to a predetermined sampling time.

The controller 27 displays a mark 66, indicating a starting position of recording the positional information, on the map of the navigation screen 30. Additionally, the controller 27 displays a line 67, indicating a cruise trajectory of the watercraft 3a, on the map of the navigation screen 30.

In step S104, the controller 27 determines whether or not recording of the positional information should be ended. For example, when the user performs an operation to end recording of the positional information with respect to the wireless communication terminal 2a, the controller 27 determines to end recording of the positional information. Alternatively, the controller 27 may determine to automatically end recording of the positional information in response to deactivation of the application software. When the controller 27 determines to end recording the positional information, the process proceeds to step S105.

Figure 5:
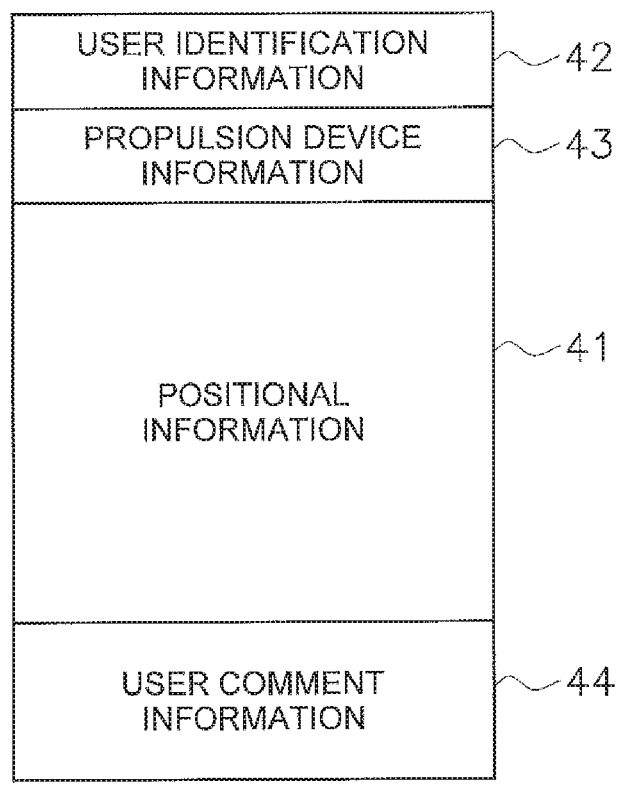
FIG. 5 is a schematic diagram showing a configuration of cruise trajectory data.

In step S105, the controller 27 transmits cruise trajectory data to the server system 1. FIG. 5 is a schematic diagram showing a configuration of the cruise trajectory data. As shown in FIG. 5, the cruise trajectory data includes positional information 41, user identification information 42, and propulsion device information 43, for example. The positional information 41 is the positional information of the watercraft 3a recorded in step S103.

The user identification information 42 contains a user ID and a password to identify the user. The user ID and the password may be registered in the application software, and thus, may be stored in the storage 21. Alternatively, the user ID and the password may be inputted by the user through the interface 25.

The propulsion device information 43 indicates a type of the propulsion device provided on the watercraft 3a. The propulsion device information 43 indicates, for instance, a type of the propulsion device such as a PWC (Personal Watercraft), a jet boat, an outboard motorboat, a yacht or so forth. The propulsion device information 43 may be preliminarily inputted by the user through the interface 25 so as to be registered in the application software, and thus, may be stored in the storage 21.

The propulsion device information 43 is not limited to information directly indicating the type of the propulsion device, and may be arbitrarily set as long as the type of the propulsion device is specified. For example, the propulsion device information 43 may be a unique vessel body number. The server system 1 may store a database of a plurality of pieces of the propulsion device information 43 associated with the unique vessel body numbers, and may determine the propulsion device information 43 of the watercraft 3a that the user is aboard with reference to the database. Alternatively, the propulsion device information 43 may be one selected from a plurality of draft groups. The plurality of draft groups are classified based on values of watercraft draft associated with the types of propulsion devices.

Figure 6:
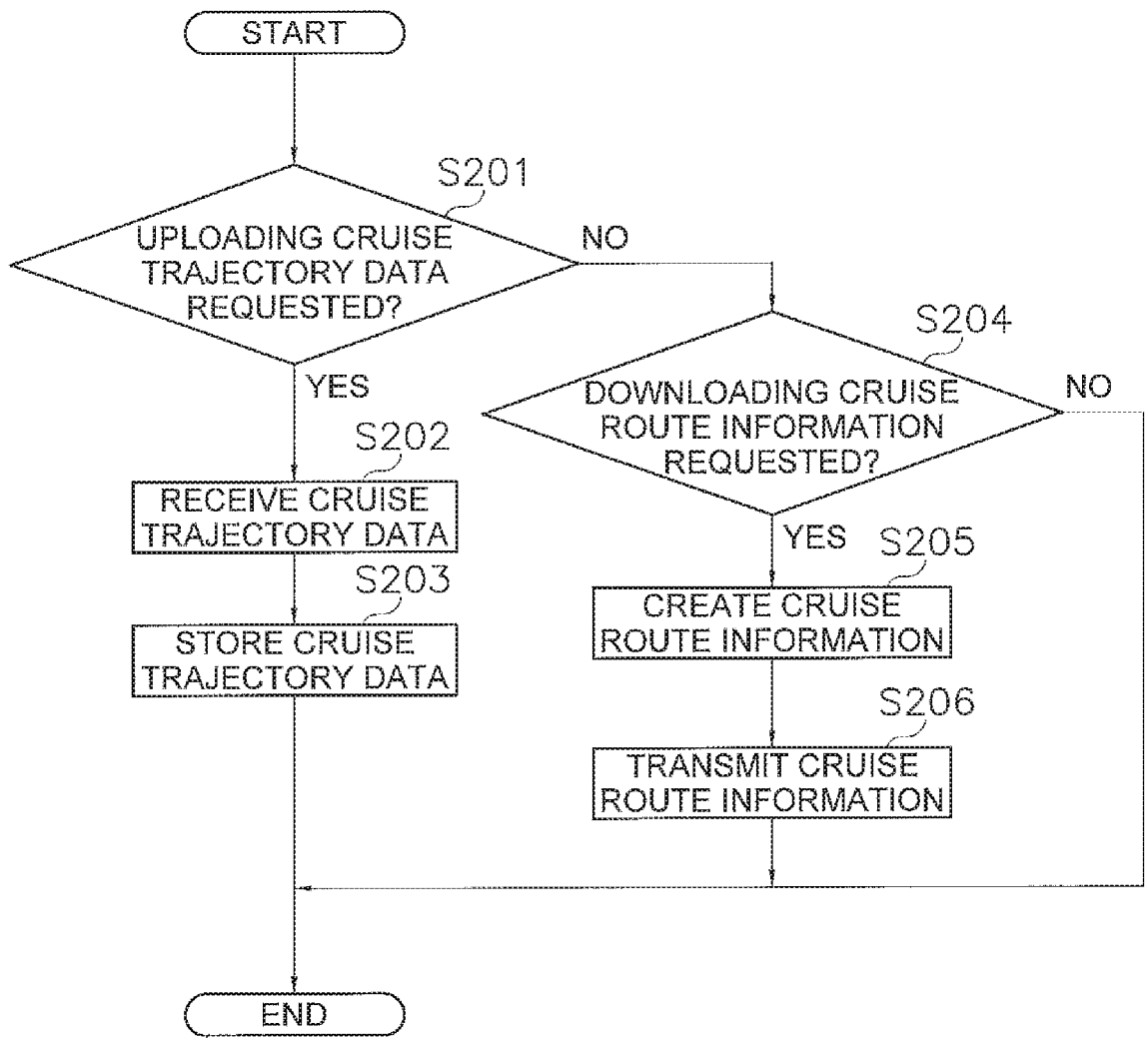
FIG. 6 is a flowchart showing processes to be executed by a controller of a server system.

FIG. 6 is a flowchart showing processes to be executed by the controller 13 of the server system 1. As shown in FIG. 6, in step S201, the controller 13 determines whether or not uploading the cruise trajectory data has been requested from the wireless communication terminal 2a. When uploading the cruise trajectory data has been requested from the wireless communication terminal 2a, the process proceeds to step S202.

In step S202, the controller 13 receives the cruise trajectory data from the wireless communication terminal 2a. In step S203, the controller 13 stores the received cruise trajectory data in the storage 11. The controller 13 obtains the propulsion device information 43 and the positional information 41 of the watercraft 3a from the cruise trajectory data. The controller 13 creates cruise trajectory information and stores the created cruise trajectory information in the storage 11 based on the positional information 41 of the watercraft 3a in association with the type of the propulsion device on the watercraft 3a. The cruise trajectory information indicates an actual cruise trajectory of the watercraft 3a.

It should be noted that the controller 13 receives the cruise trajectory data not only from the wireless communication terminal 2a but also from the other wireless communication terminals 2b and 2c, and stores a plurality of pieces of cruise trajectory information, each of which is created from the cruise trajectory data received from each wireless communication terminal, in the storage 11. Additionally, the controller 13 receives the cruise trajectory data consistently from the wireless communication terminal 2a a plurality of times, and stores a plurality of pieces of cruise trajectory information, each of which is created from the cruise trajectory data received at each of the plurality of times, in the storage 11.

In step S204, the controller 13 determines whether or not downloading cruise route information has been requested from the wireless communication terminal 2a. As described below, when displaying the cruise route information has been requested from the wireless communication terminal 2a, the controller 13 determines that downloading the cruise route information has been requested from the wireless communication terminal 2a. When downloading the cruise route information has been requested from the wireless communication terminal 2a, the process proceeds to step S205.

In step S205, the controller 13 creates the cruise route information. The controller 13 creates the cruise route information by analyzing the plurality of pieces of the cruise trajectory information stored in the storage 11. More specifically, the controller 13 determines a frequency at which cruise trajectories of each watercraft 3a, 3b, 3c match the cruise trajectories of each watercraft 3a, 3b, 3c based on the stored plurality of pieces of cruise trajectory information. Then, the controller 13 creates the cruise route information in association with the type of the propulsion device on the watercraft 3a. The cruise route information displays matching positions at which the cruise trajectories match in a visually distinguishable manner in accordance with the matching frequency.

Figure 7:
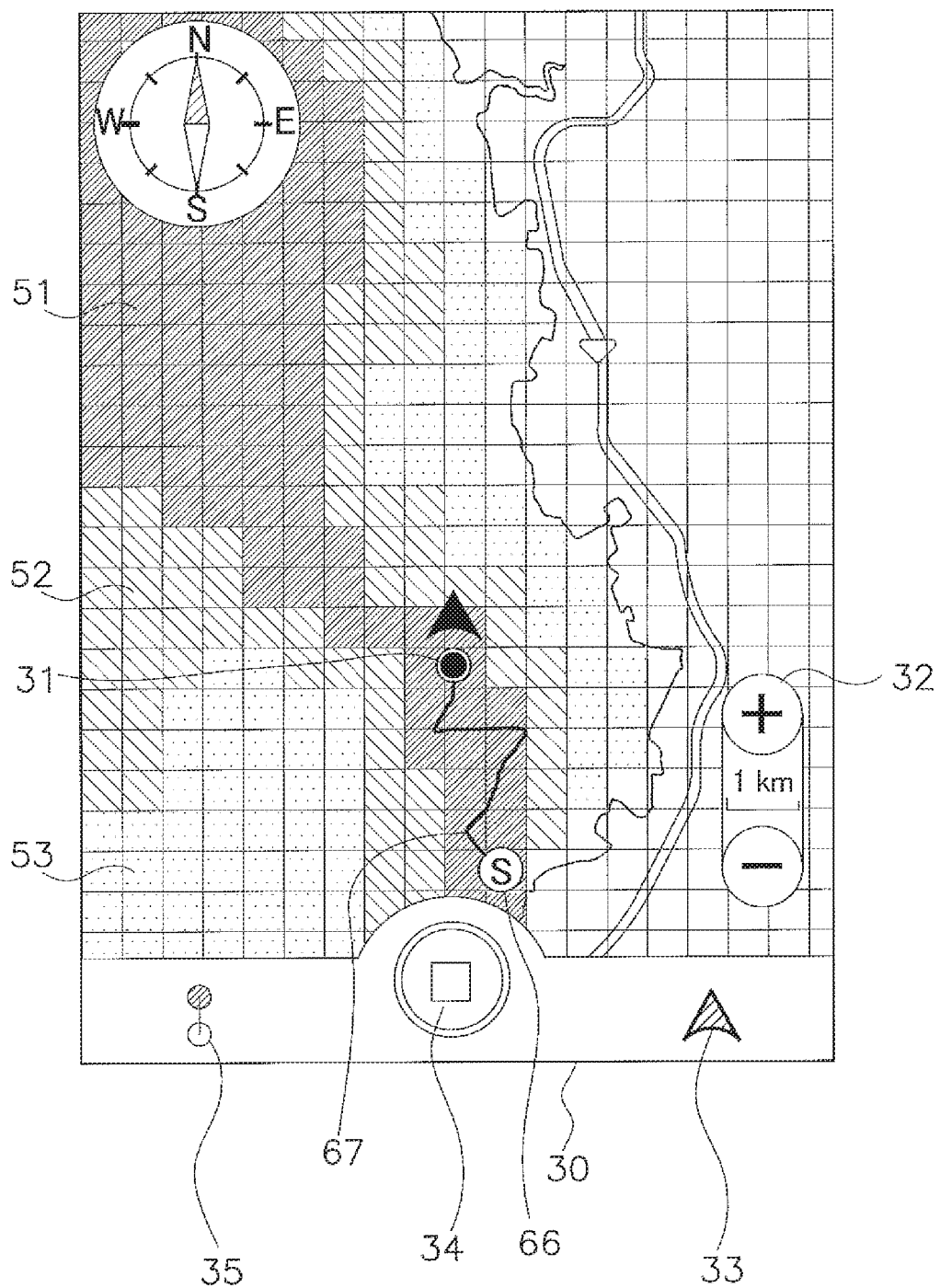
FIG. 7 is a diagram showing an example of cruise route information.

FIG. 7 is a diagram showing an example of the cruise route information. As shown in FIG. 7, the controller 13 divides coordinates of the map into a plurality of regions with a grid pattern, and determines the matching frequency of cruise trajectories on a per-region basis. Then, the controller 13 creates the cruise route information in association with the type of the propulsion device on the watercraft 3a by displaying the regions in a visually distinguishable manner in accordance with the matching frequency.

For example, the controller 13 distinguishably displays the regions in accordance with the matching frequency by color gradation or color coding. The controller 13 classifies values of the matching frequency into a plurality of levels, and distinguishably displays the regions in accordance with the levels. For example, the controller 13 classifies the values of the matching frequency into "high", "intermediate" and "low" levels, and distinguishably displays the regions in accordance with the levels. In FIG. 7, a region 51 corresponding to the "high" level, a region 52 corresponding to the "intermediate" level and a region 53 corresponding to the "low" level are shown with different types of hatching. It should be noted that the number of levels is not limited to three, and alternatively, may be less than three or may be greater than three.

The cruise route information is created in association with the type of the propulsion device on the watercraft 3a. For example, when the watercraft 3a is an outboard motorboat, the controller 13 creates the cruise route information based on a plurality of pieces of cruise trajectory information stored in the storage 11 in association with the outboard motorboat. As another example, when the watercraft 3a is a PWC, the controller 13 creates the cruise route information based on a plurality of pieces of cruise trajectory information stored in the storage 11 in association with the PWC. In step S206, the controller 13 transmits the cruise route information to the wireless communication terminal 2a.

As shown in FIG. 3, in step S106, the controller 27 of the wireless communication terminal 2a determines whether or not displaying the cruise route information has been requested. For example, when the user performs an operation to display the cruise route information with respect to the wireless communication terminal 2a, the controller 27 determines that displaying the cruise route information has been requested. When displaying the cruise route information has been requested, the process proceeds to step S107.

In step S107, the controller 27 receives the cruise route information. As described above, the controller 27 transmits the request of downloading the cruise route information to the server system 1, and receives the cruise route information created by the server system 1. Then in step S108, the controller 27 displays the cruise route information. As shown in FIG. 7, the controller 27 displays the cruise route information on the map of the navigation screen 30 in a superimposed manner such that the cruise route information is distinguishably displayed in accordance with the matching frequency of cruise trajectories.

In the server system 1 according to the present preferred embodiment, the cruise route information is displayed on the map of the navigation screen 30, while being distinguishable in accordance with the matching frequency of cruise trajectories. Accordingly, the cruise information is able to be displayed on the navigation screen 30 as a virtual marine route available for cruising. Additionally, the cruise trajectory data of the plurality of watercrafts 3a, 3b and 3c are stored in the server system 1, such that the cruise route information is created with high precision.

Figure 8:
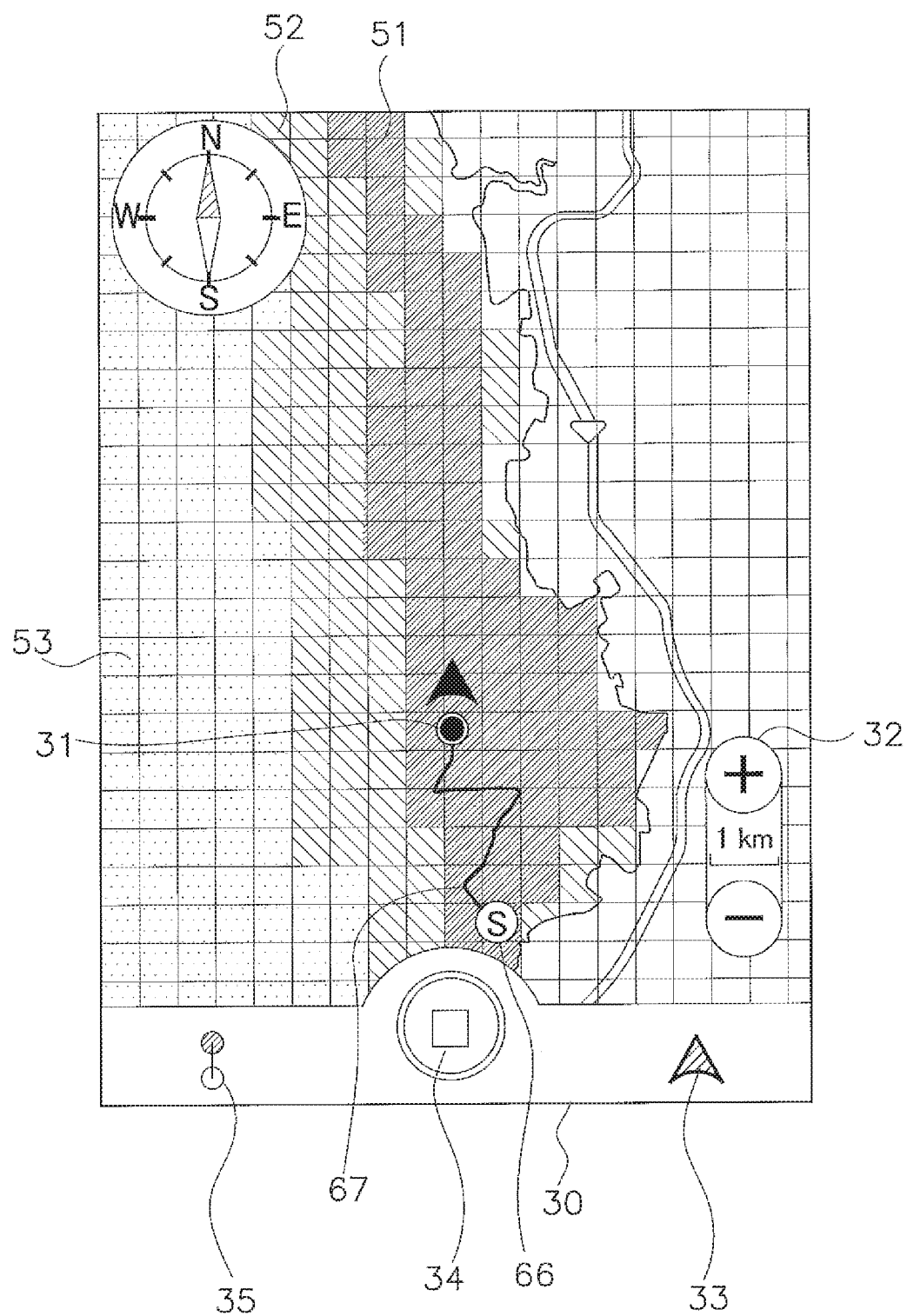
FIG. 8 is a diagram showing cruise route information associated with a type of propulsion device different from that with which the cruise route information shown in FIG. 7 is associated.

Furthermore, the cruise route information is created in association with the type of the propulsion device of each watercraft 3a, 3b, 3c. Therefore, for example, a cruise route available for cruising of an outboard motorboat and that available for cruising of a PWC are created as different pieces of cruise route information. FIG. 8 is a diagram showing the cruise route information associated with a type of propulsion device different from that with which the cruise route information shown in FIG. 7 is associated. For example, FIG. 7 shows the cruise route information associated with an outboard motorboat, whereas FIG. 8 shows the cruise route information associated with a PWC. As shown in FIGS. 7 and 8, different pieces of cruise route information are displayed even in the same water region on the navigation screen 30 in accordance with the types of the propulsion devices. Accordingly, it is possible to generate the cruise route information suitable for the type of the propulsion device on the watercraft 3a.

Figure 9A:
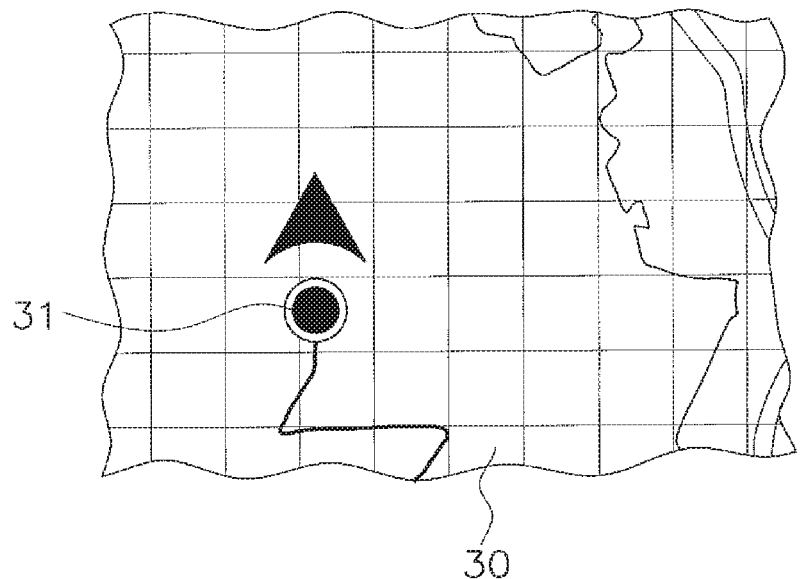
FIGS. 9A and 9B are diagrams showing grid patterns associated with different types of propulsion devices.
Figure 9B:
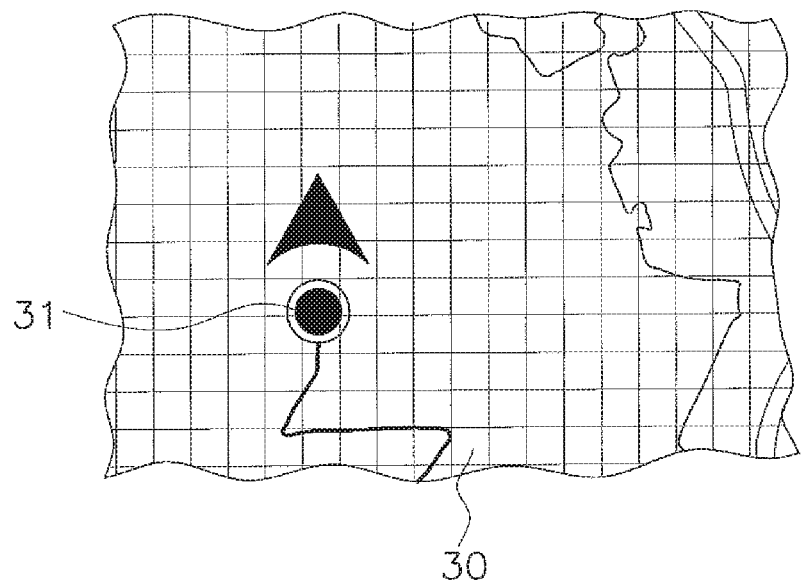

It should be noted that the marine navigation function may include a variety of functions other than the above described function. For example, the controller 13 of the server system 1 may determine the size of cells in the grid pattern in accordance with the type of the propulsion device on the watercraft 3a. For example, when the watercraft 3a is a PWC, it is preferred to set the size of the cells in the grid pattern to be less than or equal to approximately the size of a single PWC. FIGS. 9A and 9B are diagrams showing grid patterns associated with different types of propulsion devices. For example, FIG. 9A is a diagram showing the grid pattern used when the watercraft 3a is an outboard motorboat, whereas FIG. 9B is a diagram showing the grid pattern used when the watercraft 3a is a PWC. As shown in FIGS. 9A and 9B, the size of the cells in the grid pattern used when the watercraft 3a is a PWC is smaller than that used when the watercraft 3a is an outboard motorboat.

Figure 10:
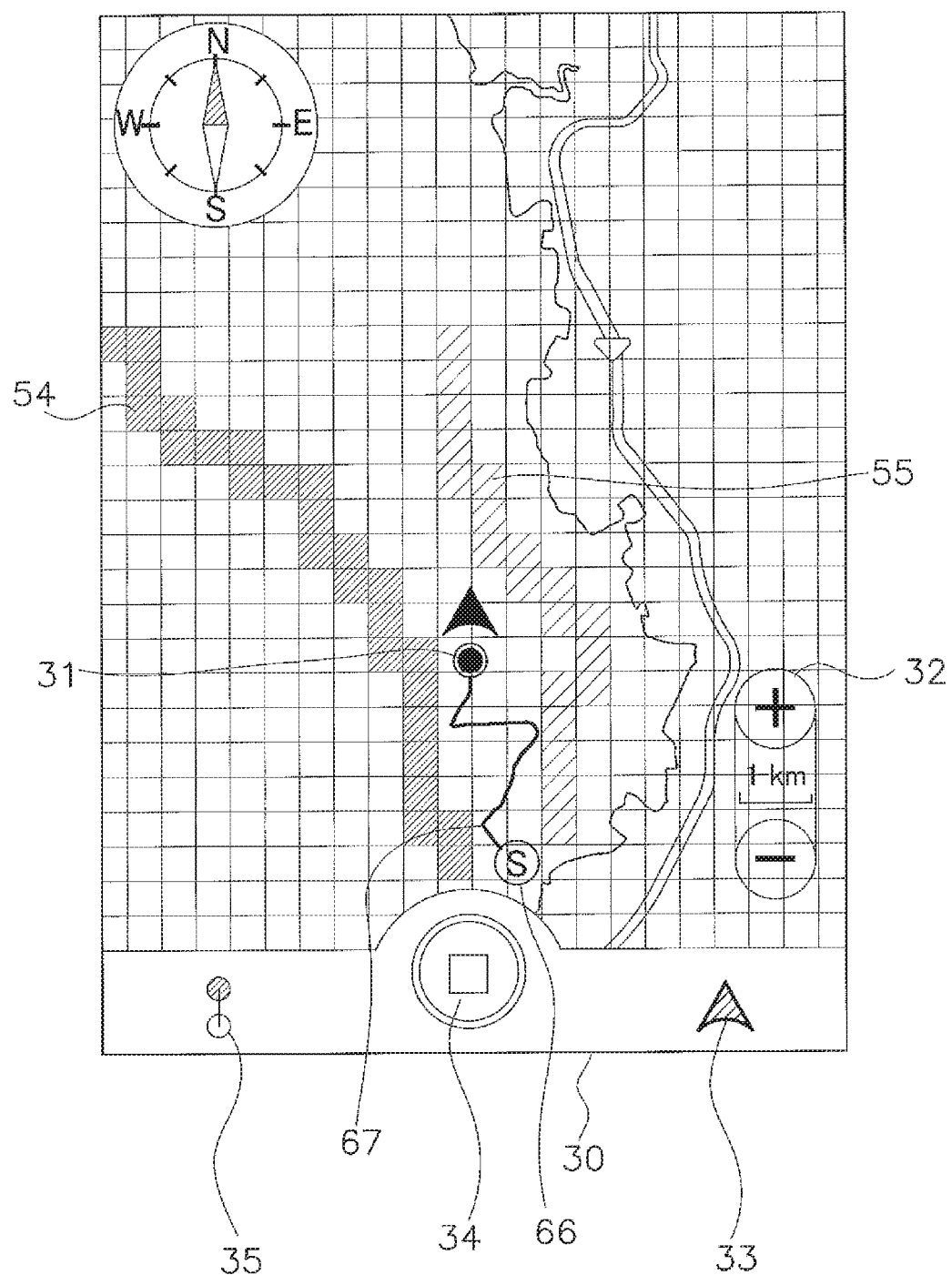
FIG. 10 is a diagram showing an example of a plurality of pieces of cruise route information associated with types of propulsion devices.

Alternatively as shown in FIG. 10, a plurality of pieces of cruise route information may be displayed on the same navigation screen 30 in a distinguishable manner, while being associated with the types of propulsion devices. For example, in FIG. 10, cruise route information 54 associated with an outboard motorboat and cruise route information 55 associated with a PWC are shown with different colors.

Yet alternatively, a user may be enabled to select the cruise route information to be displayed on the navigation screen 30. For example, the user may be enabled to select one of a plurality of display style options including: displaying all of the pieces of cruise route information; displaying the pieces of cruise route information associated with the propulsion device on the watercraft 3a that the user is aboard; and distinguishably displaying all of the pieces of cruise route information in accordance with the types of propulsion devices.

Figure 11:
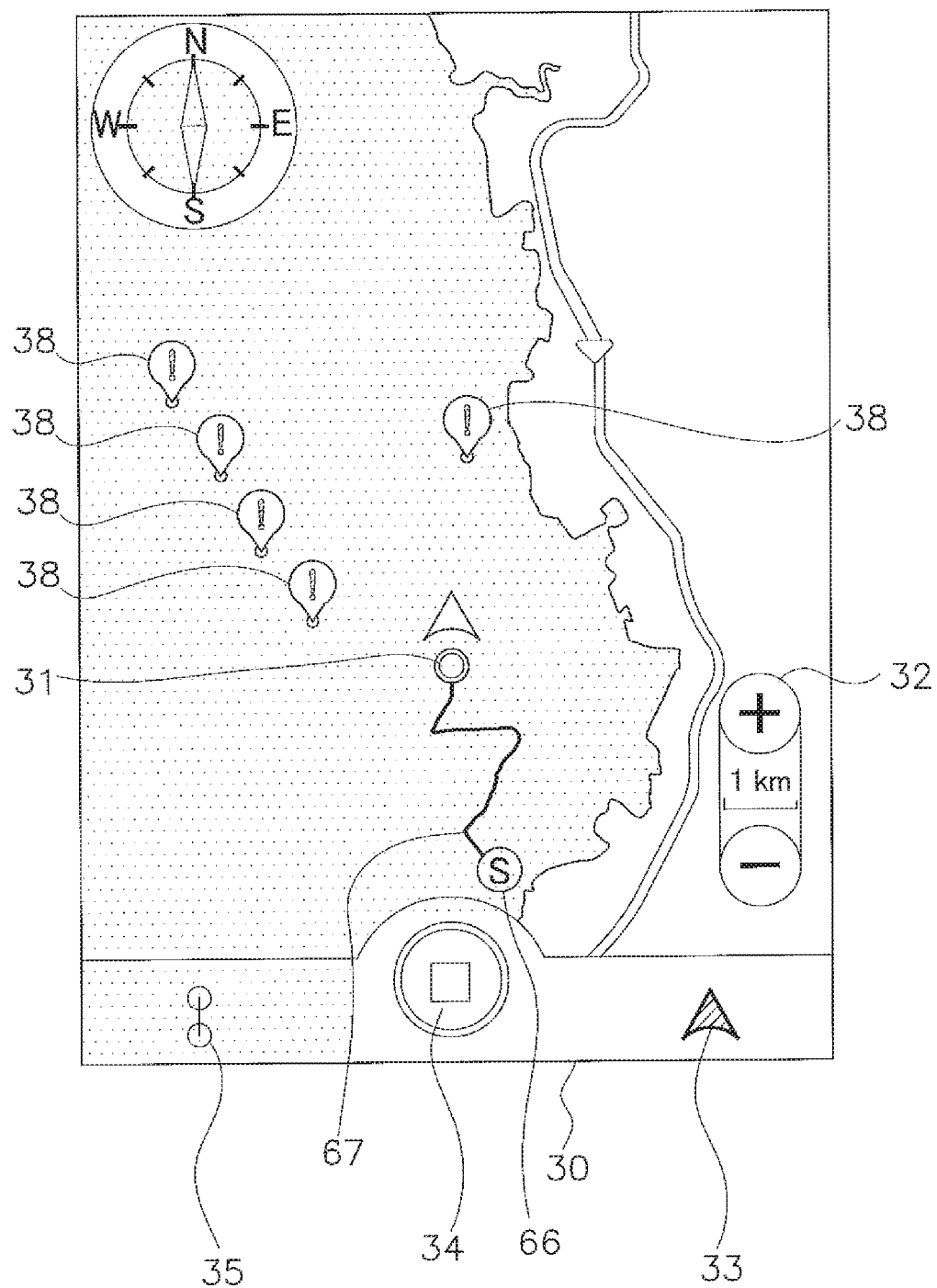
FIG. 11 is a diagram showing an example of a navigation screen related to a comment registration function.

The marine navigation function may include a function to register a comment from a user. The user is enabled to specify and register a desired spot on the map of the navigation screen 30. For example, when the interface 25 includes a touchscreen, the user is enabled to specify and register a spot on the map of the navigation screen 30 by touching the spot. Alternatively, the user may specify a spot on the map of the navigation screen 30 by placing a cursor on the spot. As shown in FIG. 11, registered spots are displayed as marks 38 on the map of the navigation screen 30. It should be noted that the user may be enabled to select one of the style options for the marks 38 indicating the registered spots.

Additionally, the user is enabled to input and register a comment with respect to each spot indicated by each mark 38. For example, the user is enabled to register a comment with respect to a spot with an obstacle such as a shoal, a reef, fishing tackle or so forth. When the user registers a comment with respect to a spot, the controller 27 of the wireless communication terminal 2a stores user comment information, including coordinates of the spot, the time and the comment, in the storage 21.

Figure 12:
FIG. 12 is a diagram showing an example of a list related to the comment registration function.

As shown in FIG. 12, the navigation screen 30 is able to display a list 39 of comments. Additionally, the user is enabled to search an intended comment from the comments in the list 39. Furthermore, when the user selects a given comment from the comments in the list 39, a spot linked to the given comment is able to be displayed on the map of the navigation screen 30.

It should be noted that, as shown in FIG. 5, the controller 27 of the wireless communication terminal 2a may transmit user comment information 44 to the server system 1, while user comment information 44 is contained in the cruise trajectory data. With this configuration, the controller 13 of the server system 1 may enable a plurality of users to share a plurality of pieces of user comment information 44 of their own.

The marine navigation function may include a function to determine a cruise route available for cruising in accordance with the water depth and the type of the propulsion device on the watercraft. In this case, the storage 11 of the server system 1 stores water depth information that indicates values of the water depth in the coordinates of the map. The water depth information may be updated based on water depth data contained in the positional information 41 transmitted from the wireless communication terminal 2a. The controller 13 of the server system 1 creates the cruise route information based on the water depth information. The controller 27 distinguishably displays a cruise route available for cruising on the navigation screen 30 in accordance with the water depth and the type of the propulsion device. The controller 27 compares a value of the water depth with a predetermined threshold, and displays a cruise route having a water depth of less than the predetermined threshold as a cruise route unavailable for cruising. The predetermined threshold is determined in accordance with the type of the propulsion device.

The controller 13 of the server system 1 may further consider tide level information in creating the cruise route information based on the water depth information. FIG. 13 is a diagram showing an example of tide level information 45. The tide level information 45 includes a plurality of sets of tide levels and times and dates of low tide and high tide. The controller 27 corrects values of the water depth with displacements calculated from values of the tide levels in the tide level information 45. The controller 27 determines a cruise route available for cruising by comparing the corrected values of the water depth with a threshold. Accordingly, it is possible to determine a cruise route available for cruising on a per-cruise clock time basis.

Figure 14:
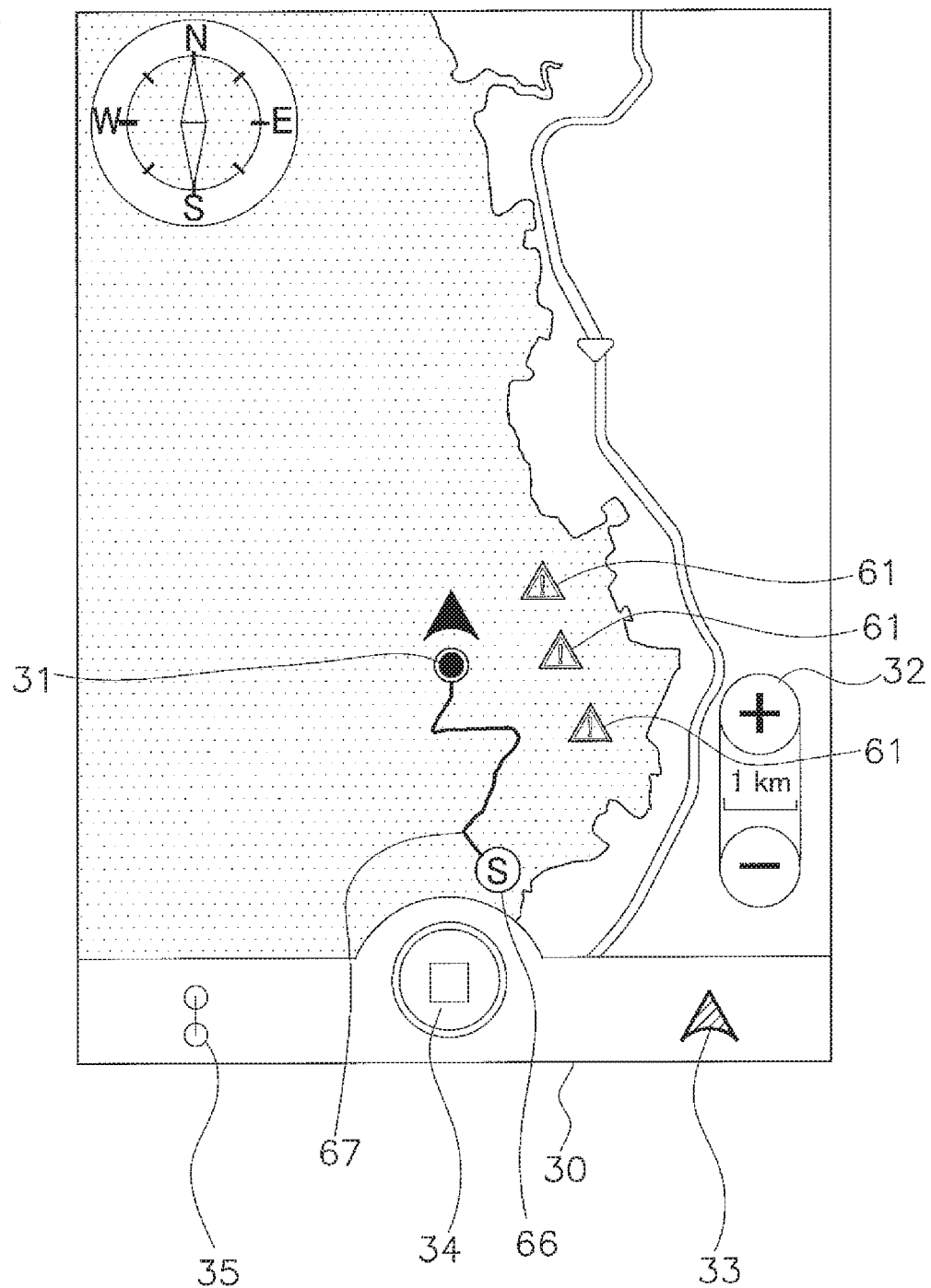
FIG. 14 is a diagram showing an example of alert spot information.

Alternatively, the controller 13 of the server system 1 may create alert spot information based on the water depth information and the propulsion device information 43, and may transmit the cruise route information to the wireless communication terminal 2a while the cruise route information contains the alert spot information. The alert spot information contains coordinates of a spot determined as unavailable for cruising. As shown in FIG. 14, the controller 27 of the wireless communication terminal 2a may display marks 61, each of which indicates an alert spot, on the map of the navigation screen 30 based on the alert spot information. Additionally, the controller 27 of the wireless communication terminal 2a may issue an alert when the present position of the watercraft 3a approaches the alert spot. The alert may be issued in the form of, for instance, sound, display or blinking.

The marine navigation function may include a function to create the cruise route information in accordance with the control mode of the watercraft 3a. In this case, the cruise trajectory information contains control information that indicates a control mode used by the watercraft 3a when recording a cruise trajectory. The control mode includes, for instance, a fishing mode and a towing mode. The fishing mode and the towing mode are modes of controlling the propulsion device on the watercraft 3a so as to move the watercraft 3a at a set constant velocity. The velocity in the fishing mode is lower than that in the towing mode.

The controller 13 of the server system 1 creates the cruise route information in association with the control mode. Therefore, the controller 13 creates the cruise route information in the fishing mode and that in the towing mode. The user is enabled to select and display the cruise route information in the fishing mode. The user is also enabled to select and display the cruise route information in the towing mode. Alternatively, the controller 27 of the wireless communication terminal 2a may display both the cruise route information in the fishing mode and that in the towing mode on the same navigation screen 30. It should be noted that the control mode may include not only the fishing mode and the towing mode but also one or more other modes.

The marine navigation function may include a location sharing function that enables colleagues to share the present positions of a plurality of watercrafts. In the location sharing function, the controller 13 of the server system 1 transmits the positional information 41 of another watercraft located within a predetermined range from the watercraft 3a to the wireless communication terminal 2a based on the positional information 41 of the watercraft 3a. For example, as shown in FIG. 4, the controller 27 of the wireless communication terminal 2a displays marks 62, each of which indicates the position of another watercraft, on the navigation screen 30.

In the location sharing function, the user aboard the watercraft 3a may be enabled to select a colleague to be authorized to share the present position of the watercraft 3a. In this case, the user registers in advance a user ID of a colleague to be authorized to share the present position of the watercraft 3a. The controller 27 of the wireless communication terminal 2a transmits the registered user ID to the server system 1. The server system 1 stores the registered user ID in the storage 21. Thus, sharing the positional information 41 is authorized within a group of registered user IDs.

Alternatively, a plurality of levels may be settable for the present positional information intended for sharing, and each of a plurality of groups of colleague user IDs may be assigned with one of the plurality of levels. In this case, the user registers one of the levels of the present positional information intended for sharing in association with each of the groups of colleague user IDs. The controller 13 of the server system 1 authorizes sharing the positional information 41 of each user, without authorizing sharing the user identification information 42 of each user, within a group of colleague user IDs assigned with a "low" level of sharing. Therefore, as shown in FIG. 4, the controller 27 of the wireless communication terminal 2a displays only the marks 62, each of which indicates another watercraft, on the map of the navigation screen 30, without displaying the user identification information.

Figure 15:
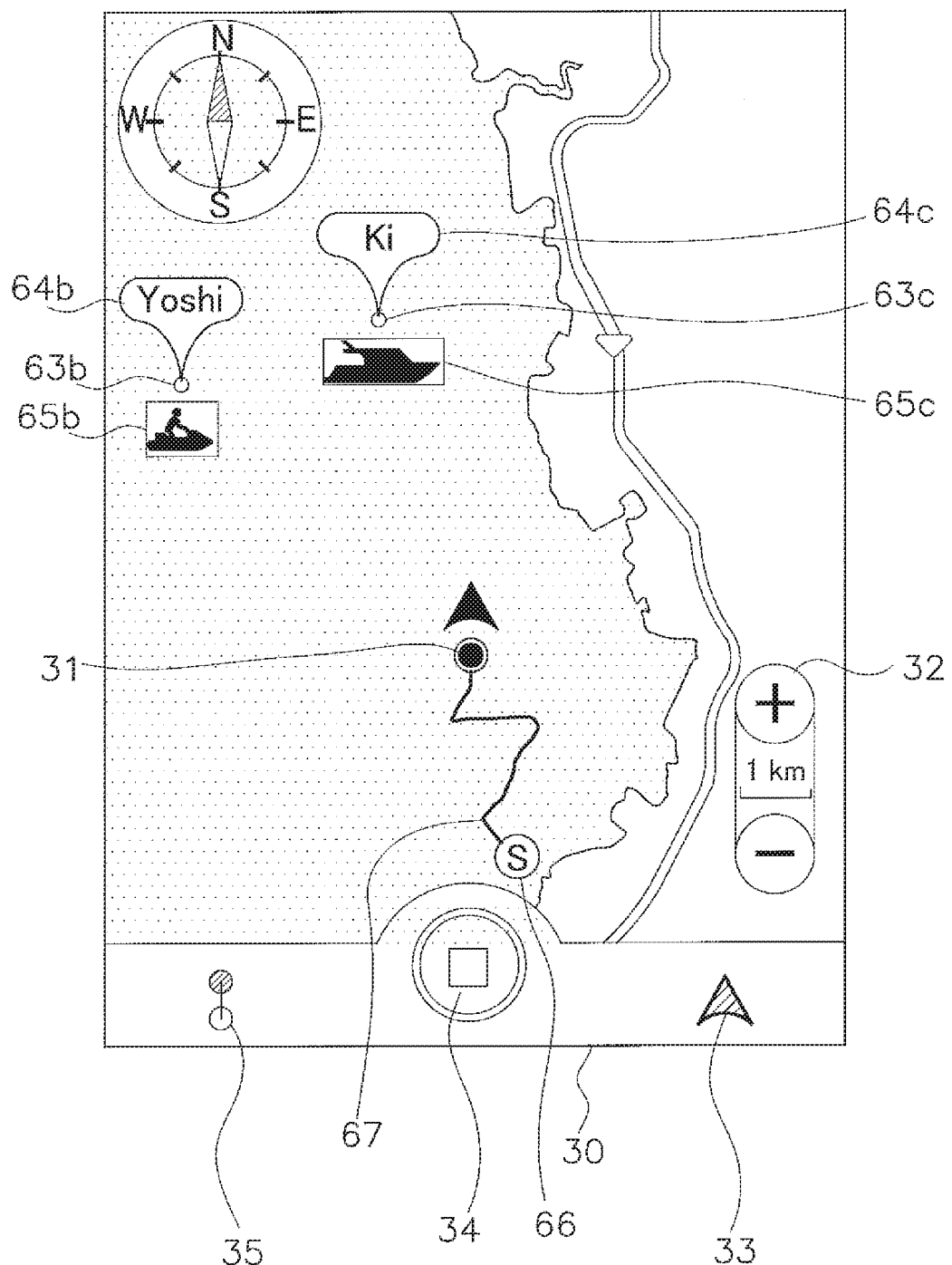
FIG. 15 is a diagram showing an example of a navigation screen related to a location sharing function.

On the other hand, the controller 13 of the server system 1 authorizes sharing the positional information 41 of each user and the user identification information 42 of each user within a group of colleague user IDs associated with a "high" level of sharing. Therefore, as shown in FIG. 15, the controller 27 of the wireless communication terminal 2a displays marks 64b and 64c that indicate pieces of the user identification information 42 (e.g., user IDs), together with marks 63b and 63c that indicate the positions of the other watercrafts 3b and 3c, on the map of the navigation screen 30. Additionally or alternatively, marks 65b and 65c that indicate the types of the propulsion devices of the other watercrafts 3b and 3c may be displayed as marks that indicate pieces of the user identification information 42.

Preferred embodiments of the present invention have been explained above. However, the present invention is not limited to the above-described preferred embodiments, and a variety of changes can be made without departing from the gist of the present invention.

The number of servers in the server system 1 is not limited to one, and may include a plurality of servers.

The wireless communication terminal 2a may be included in a navigation device mounted to the watercraft 3a. In other words, the marine navigation function may be executed by a program installed in a dedicated navigation device. The navigation device may have a function of communicating with the server system 1. Alternatively, the navigation device may be connected to a mobile communication device such as a smart phone, a feature phone or so forth, and may communicate with the server system 1 through the mobile communication device.

The marine navigation function may include a function of searching a cruise route. For example, when the user specifies a destination, the controller 13 of the server system 1 or the controller 27 of the wireless communication terminal 2a may determine a cruise route from the present position of the watercraft 3a to the destination, and may display the cruise route on the navigation screen 30. In this case, the cruise route may be determined with reference to the aforementioned cruise route information. For example, the cruise route may be determined such that the watercraft 3a passes through a region corresponding the "high" level of matching frequency. The user may be enabled to select one of the levels of matching frequency when determining the cruise route.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A server system communicating with a wireless communication terminal, the server system comprising:
    a communicator;
    a storage; and
    a controller configured or programmed to:
        receive positional information of a watercraft that a user of the wireless communication terminal is aboard and propulsion device information from the wireless communication terminal through the communicator, the propulsion device information including a type of a propulsion device on the watercraft;
        create cruise trajectory information and store the created cruise trajectory information in the storage based on the positional information of the watercraft in association with the type of the propulsion device on the watercraft, the cruise trajectory information indicating an actual cruise trajectory of the watercraft;
        determine a matching frequency at which cruise trajectories of the watercraft match the cruise trajectories of the cruise trajectory information stored in the storage; and
        create cruise route information in association with the type of the propulsion device on the watercraft, the cruise route information displaying matching positions at which the cruise trajectories of the watercraft match the cruise trajectories of the cruise trajectory information stored in the storage in a visually distinguishable manner in accordance with the matching frequency; wherein
    the matching frequency is a number of times that the cruise trajectories of the watercraft match the cruise trajectories of the cruise trajectory information stored in the storage.

2. The server system according to claim 1, wherein the controller is further configured or programmed to:
    divide map coordinates into a plurality of regions with a grid pattern;
    determine the matching frequency of thea plurality of regions on a per-region basis; and
    create the cruise route information in association with the type of the propulsion device on the watercraft by displaying the plurality of regions in the visually distinguishable manner in accordance with the matching frequency.

3. The server system according to claim 2, wherein the controller is further configured or programmed to determine a size of cells in the grid pattern in accordance with the propulsion device information.

4. The server system according to claim 1, wherein
the cruise trajectory information includes control information;
the control information indicates a control mode executed by the watercraft when recording the cruise trajectory of the watercraft; and
the controller is further configured or programmed to create the cruise route information in association with the control mode by displaying the matching positions of the cruise trajectories in the visually distinguishable manner in accordance with the matching frequency.

5. The server system according to claim 1, wherein
the storage stores water depth information indicating a water depth in map coordinates; and
the controller is further configured or programmed to create the cruise route information based on the water depth information.

6. The server system according to claim 1, wherein the controller is further configured or programmed to transmit the positional information of at least one other watercraft located within a predetermined range from the watercraft that the user is aboard to the wireless communication terminal through the communicator based on the positional information of the watercraft.

7. The server system according to claim 6, wherein the controller is further configured or programmed to:
receive identification information of the user of the wireless communication terminal from the wireless communication terminal through the communicator; and
transmit the positional information of one of the at least one other watercraft located within the predetermined range from the watercraft that the user is aboard to the wireless communication terminal through the communicator as long as another user aboard the one of the at least one other watercraft is authorized by the user.

8. A method executed by a controller in a server system communicating with a wireless communication terminal and a storage, the method comprising:
receiving positional information of a watercraft that a user of the wireless communication terminal is aboard and propulsion device information from the wireless communication terminal, the propulsion device information including a type of a propulsion device on the watercraft;
creating cruise trajectory information and storing the created cruise trajectory information in the storage based on the positional information of the watercraft in association with the type of the propulsion device on the watercraft, the cruise trajectory information indicating an actual cruise trajectory of the watercraft;
determining a matching frequency at which cruise trajectories of the watercraft match positions of the cruise trajectories of the cruise trajectory information stored in the storage; and creating cruise route information in association with the type of the propulsion device on the watercraft, the cruise route information displaying matching positions at which the cruise trajectories of the watercraft match the cruise trajectories of the cruise trajectory information stored in the storage in a visually distinguishable manner in accordance with the matching frequency; wherein
the matching frequency is a number of times that the cruise trajectories of the watercraft match the cruise trajectories of the cruise trajectory information stored in the storage.

9. The method according to claim 8, further comprising the steps of:
dividing map coordinates into a plurality of regions with a grid pattern; and
determining the matching frequency of the plurality of regions on a per-region basis; wherein
the cruise route information is created in association with the type of the propulsion device on the watercraft by displaying the plurality of regions in the visually distinguishable manner in accordance with the matching frequency.

10. The method according to claim 9, further comprising the step of:
determining a size of cells in the grid pattern in accordance with the propulsion device information.

11. The method according to claim 8, wherein
the cruise trajectory information includes control information;
the control information includes a control mode executed by the watercraft when recording the cruise trajectory of the watercraft; and
the cruise route information is created in association with the control mode by displaying the matching positions of the cruise trajectories in the visually distinguishable manner in accordance with the matching frequency.

12. The method according to claim 8, wherein
the storage stores water depth information indicating a water depth in map coordinates; and
the method further comprises the step of creating the cruise route information based on the water depth information.

13. The method according to claim 8, further comprising the step of:
transmitting the positional information of at least one other watercraft located within a predetermined range from the watercraft that the user is aboard to the wireless communication terminal based on the positional information of the watercraft.

14. The method according to claim 13, further comprising the steps of:
receiving identification information of the user of the wireless communication terminal from the wireless communication terminal; and
transmitting the positional information of one of the at least one other watercraft located within the predetermined range from the watercraft that the user is aboard to the wireless communication terminal as long as another user aboard the one of the at least one other watercraft is authorized by the user.

* * * * *